(12) United States Patent
Kendzia, III et al.

(10) Patent No.: US 11,362,507 B2
(45) Date of Patent: Jun. 14, 2022

(54) GROUND FAULT PROTECTION IN A HIGH RESISTANCE GROUNDING SYSTEM

(71) Applicant: ABB Schweiz AG, Baden (CH)

(72) Inventors: Thomas Kendzia, III, Henrico, VA (US); Veerakumar Bose, Richmond, VA (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/986,716

(22) Filed: Aug. 6, 2020

(65) Prior Publication Data

US 2022/0045500 A1     Feb. 10, 2022

(51) Int. Cl.
*H02H 3/16*     (2006.01)
*H02H 3/32*     (2006.01)

(52) U.S. Cl.
CPC ............ *H02H 3/165* (2013.01); *H02H 3/167* (2013.01); *H02H 3/325* (2013.01)

(58) Field of Classification Search
CPC ...... H02H 1/0007; H02H 1/0038; H02H 3/16; H02H 3/162; H02H 3/165; H02H 3/167; H02H 3/28; H02H 3/325; H02H 3/34
See application file for complete search history.

(56) References Cited

U.S. PATENT DOCUMENTS 6,794,879 B2    9/2004   Lawson et al.
9,383,399 B2    7/2016   Wei et al.
(Continued)

FOREIGN PATENT DOCUMENTS

JP         4772169 B1 *   9/2011           H01H 33/593
JP     2019068645 A *   4/2019
(Continued)

OTHER PUBLICATIONS

M. Valdes, T. Papallo and B. Premerlani, "Ground Fault Location in Low-Voltage High-Resistance Grounded Systems via the Single-Processor Concept for Circuit Protection," Conference Record of 2006 Annual Pulp and Paper Industry Technical Conference, 2006, pp. 1-8, doi: 10.1109/PAPCON.2006.1673771. (Year: 2006).*
(Continued)

*Primary Examiner* — Fred E Finch, III
(74) *Attorney, Agent, or Firm* — Greenberg Traurig, LLP

(57) ABSTRACT

Systems, methods, techniques and apparatuses of ground fault protection are disclosed. One exemplary embodiment is a power switch being structured to receive a load current from a power source at a source-side and selectively output the load current from a load-side to a load; a first voltage measuring device structured to measure a first voltage of the source-side while the power switch is conducting the load current; a second voltage measuring device structured to measure a second voltage of the load-side while the first voltage measuring device is measuring the first voltage; and a controller structured to determine a source-side-to-ground voltage based on the first voltage, determine a load-side-to-ground voltage based on the second voltage, determine a ground fault is occurring, and determine a direction of the ground fault relative to the power switch by comparing the source-side-to-ground voltage and the load-side-to-ground voltage.

20 Claims, 4 Drawing Sheets

(56) References Cited

U.S. PATENT DOCUMENTS

| | | | |
|---|---|---|---|
| 2006/0002043 A1 | 1/2006 | Disalvo et al. | |
| 2012/0123708 A1 | 5/2012 | Dong et al. | |
| 2017/0131340 A1* | 5/2017 | Tallam | H02M 5/458 |
| 2018/0375505 A1 | 12/2018 | Handy et al. | |
| 2019/0137557 A1* | 5/2019 | Tang | H02H 7/26 |
| 2019/0204374 A1* | 7/2019 | Wei | H02H 7/08 |
| 2020/0366078 A1* | 11/2020 | Telefus | H01H 9/56 |
| 2021/0075210 A1* | 3/2021 | Wahlroos | G01R 31/086 |

FOREIGN PATENT DOCUMENTS

| | | | | |
|---|---|---|---|---|
| JP | 2019068645 A | | 4/2019 | |
| KR | 100437446 B1 | * | 6/2004 | H02H 7/22 |
| KR | 100437446 B1 | | 6/2004 | |
| KR | 20130031583 A | * | 3/2013 | H01H 33/593 |

OTHER PUBLICATIONS

The Institute of Electical and Electronics Engineers, Inc., "Chapter 7: Grounding," IEEE Std 141-1993: IEEE Recommended Practice for Electric Power Distribution for Industrial Plants, dated 1994, pp. 363-391, IEEE, New York, USA.

International Search Report and Written Opinion, issued by the ISA/EP European Patent Office, regarding correspondence patent application Serial No. PCT/IB2021/000546; dated Jan. 7, 2022; 11 pages.

* cited by examiner

GROUND FAULT PROTECTION IN A HIGH RESISTANCE GROUNDING SYSTEM

BACKGROUND

The present disclosure relates generally to ground fault protection. High resistance grounding (HRG) power systems include a resistor inserted between a ground and a neutral point that is structured to limit ground fault current to a magnitude that will not damage connected loads. To detect a ground fault, conventional methods include turning switching devices of the HRG power system on and off to trace the ground fault; injecting a traceable signal into the HRG power system and manually tracing the ground fault with a portable ammeter; or measuring system currents using current sensors. Existing ground fault protection systems suffer from a number of shortcomings and disadvantages. There remain unmet needs including reducing fault detection time, reducing hardware complexity, and reducing load interruption. For instance, manual tracing requires a significant amount of time, during which the non-ground-faulted phases of a system experience a 73% overvoltage, putting stress on power devices such as dielectric insulation. Furthermore, current sensors installed throughout an HRG power system are significantly more expensive and more susceptible for fault current saturation than other types of sensors, such as voltage measuring devices. Finally, taking an HRG power system offline to detect ground faults interrupts the operation of connected loads. In view of these and other shortcomings in the art, there is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY OF THE DISCLOSURE

Exemplary embodiments of the disclosure include systems, methods, techniques and apparatuses for ground fault protection. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
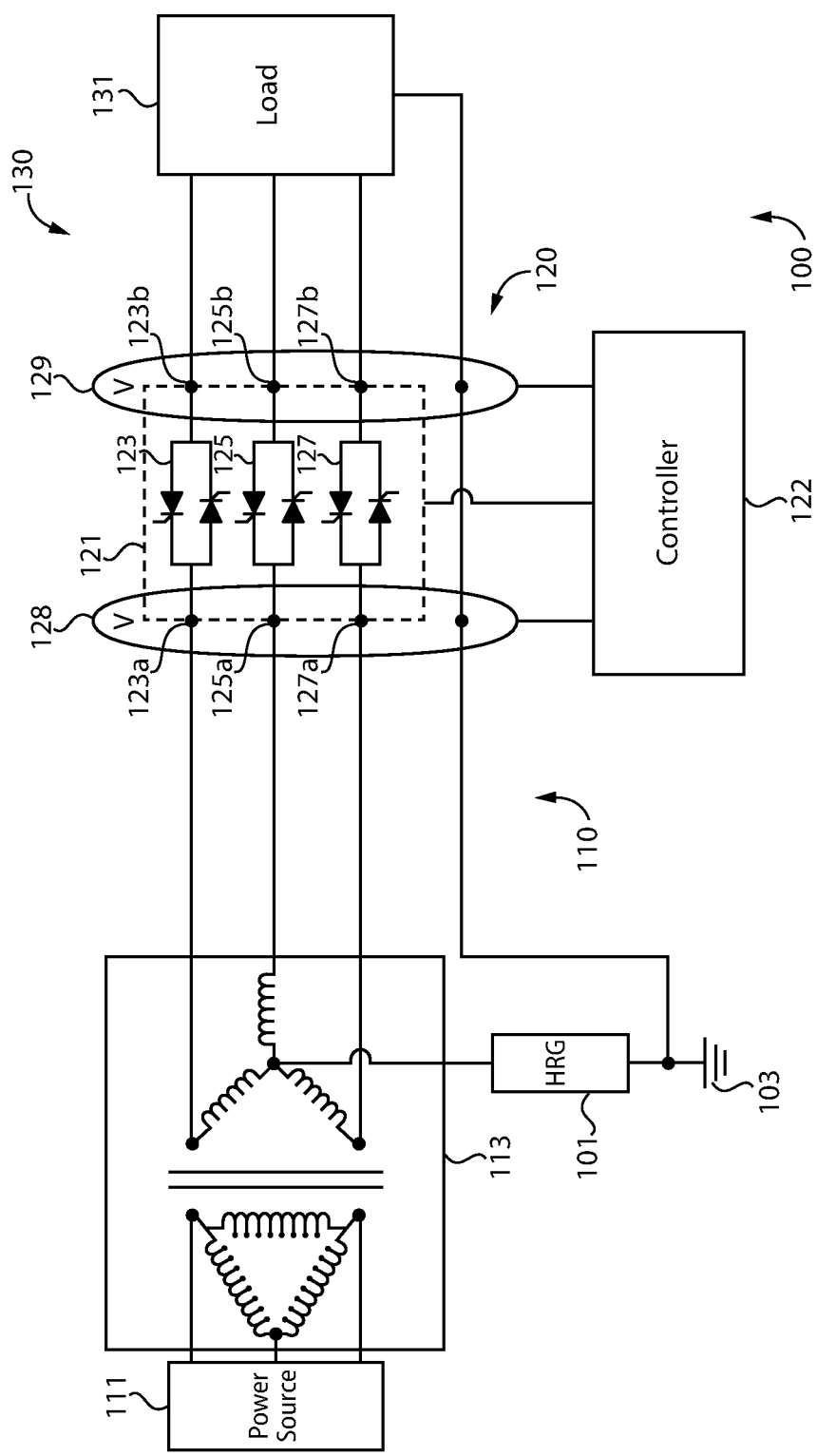
FIG. 1 is a circuit diagram illustrating an exemplary power system including a ground fault protection system.

With reference to FIG. 1, there is illustrated an exemplary high resistance grounding (HRG) power system 100 including a ground fault protection system 120. It shall be appreciated that ground fault protection system 120 may be implemented in a variety of applications, including transfer switches, microgrid disconnect switches, solid state circuit breakers, generator circuit breakers, power converters, marine vessel power distribution systems, vehicular distribution systems, and data center distribution systems, to name but a few examples. It shall be appreciated that the topology of power system 100 is illustrated for the purpose of explanation and is not intended as a limitation of the present disclosure.

In the illustrated embodiment, power system 100 is structured to provide three-phase power including a load current from power source 111 to load 131. The load current is the portion of the total nominal current received by load 131 while load 131 is operating. In other embodiments, power system 100 may be structured to provide DC power between power source 111 and load 131, or another type of AC power with a different number of phases, including a single-phase system.

HRG power system 100 includes a power network 110 and a power network 130 coupled together by way of ground fault protection system 120. Power network 110 includes power source 111 and a transformer 113. Power source 111 is coupled to a primary side of transformer 113 and ground fault protection system 120 is coupled to a secondary side of transformer 113. The primary side of transformer 113 is arranged in a delta configuration and the secondary side of transformer 113 is arranged in a wye configuration. Power source 111 may be any type of device or system structured to generate and output power.

HRG power system 100 includes a high resistance ground resistor 101 coupled between a neutral point of the wye configuration of the secondary side of transformer 113 and a ground 103. Resistor 101 is sized to allow system 100 to remain online while a ground fault occurs between one of the phase conductors of the power networks of system 100 and a grounded conductor or surface. Resistor 101 is also sized to limit ground fault current to a magnitude that will not damage components of system 100. For example, resistor 101 may be sized to limit the magnitude of the ground fault current to 5-10 A, to name but one example.

Power network 130 includes load 131 coupled to ground fault protection system 120. Load 131 may be any type of device or system structured to receive the power output by power source 111.

Ground fault protection system 120 includes a power switch 121, voltage measuring devices 128 and 129, and a controller 122. System 120 is structured to determine line-to-ground voltage on each side of power switch 121, and determine the direction of a ground fault relative to power switch 121 using the line-to-ground voltages. For example, controller 122 may determine a ground fault is located towards the power source within power network 110, or towards the load within power network 130. In certain embodiments, system 120 may respond to a ground fault by opening one of more phase power switches of power switch 121 in order to interrupt the load current.

Power switch 121 includes a source-side and a load-side. The source-side includes source-side terminals and the load-side includes load-side terminals. Power switch 121 is structured to receive power from power source 111 at the source-side and selectively output the received power at the load-side.

Power switch 121 includes a set of phase power switches 123, 125, and 127, one for each phase. Each phase power switch includes a source-side terminal and a load-side terminal: phase power switch 123 includes source-side terminal 123a and load-side terminal 123b; phase power switch 125 includes source-side terminal 125a and load-side terminal 125b; and phase power switch 127 includes source-side terminal 127a and load-side terminal 127b.

In the illustrated embodiment, the phase power switches include thyristors coupled in an anti-parallel configuration. Power switch 121 may include any type of semiconductor switch such as insulated gate bipolar transistors (IGBTs), bipolar junction transistors (BJTs), metal-oxide-semiconductor field-effect transistors (MOSFETs), gate turn-off thyristors (GTOs), MOS-controlled thyristors (MCTs), integrated gate-commutated thyristors (IGCTs), silicon carbide (SiC) switching devices, gallium nitride (GaN) switching devices, or any other type of switch having an on-state voltage drop.

Voltage measuring devices 128 and 129 are structured to measure voltages on either side of power switch 121. For example, voltage measuring device 128 may be structured to measure a voltage at each source-side terminal and voltage measuring device 129 may be structured to measure a voltage at each load-side terminal. In the illustrated embodiment, voltage measuring devices 128 and 129 measure line-to-ground voltages for each phase and transmit the voltages to controller 122. In other embodiments, voltage measuring devices 128 and 129 may measure another type of voltage and controller 122 is structured to calculate the line-to-ground voltages using the voltage measurements received from voltage measuring devices 128 and 129. In certain embodiments, voltage measuring devices 128 or 129 may include a plurality of voltage measuring devices collectively structured to measure voltages for each phase. Voltage measuring devices 128 and 129 may be any type of measuring device structured to measure voltage, such as a voltage sensor or a voltage divider, to name but a few examples.

Controller 122 is structured to determine a ground fault is occurring on one of the phases, receive voltage measurements from voltage measuring devices 128 and 129, determine a source-side-to-ground voltage for the faulted phase based on the voltage measurements received from voltage measuring device 128 in response to determining the ground fault is occurring, determine a load-side-to-ground voltage for the faulted phase based on each voltage measurement received from voltage measuring device 129 in response to determining the ground fault is occurring, and determine the direction of the ground fault using the line-ground voltages. In certain embodiments, controller 122 is also structured to mitigate the ground fault by opening one or more phase power switches, or alerting a user, to name but a few examples.

Controller 122 uses the on-state voltage drop of the power switch to determine the ground fault direction, which does not require interruption of the load current. Controller 122 also determines the ground fault direction without the use of current sensors, which in addition to being more complex, are more likely to experience current saturation, are costlier than voltage measuring devices, and become less accurate as the measured current magnitude increases.

In certain embodiments, HRG power system 100 may include more than one ground fault protection system. For example, system 100 may include an additional ground fault protection system coupled between ground fault protection system 120 and load 131. In this case, the controllers of each ground fault protection system may communicate determined ground fault directions or voltage measurements in order to further identify the location of the ground fault. For example, the ground fault protection systems would be able to determine if the ground fault was between the ground fault protection systems or between the new ground fault protection system and load 131. The ground fault protection systems may also operate their respective power switches based on their own determined ground fault direction and the ground fault direction received from the other ground fault protection system.

It shall be appreciated that any or all of the foregoing features of power system 100 may also be present in the other power systems disclosed herein. While the embodiments described hereinafter may not specifically describe features analogous to the features of system 100, such features may nonetheless be employed in connection with the described systems.

Figure 2:
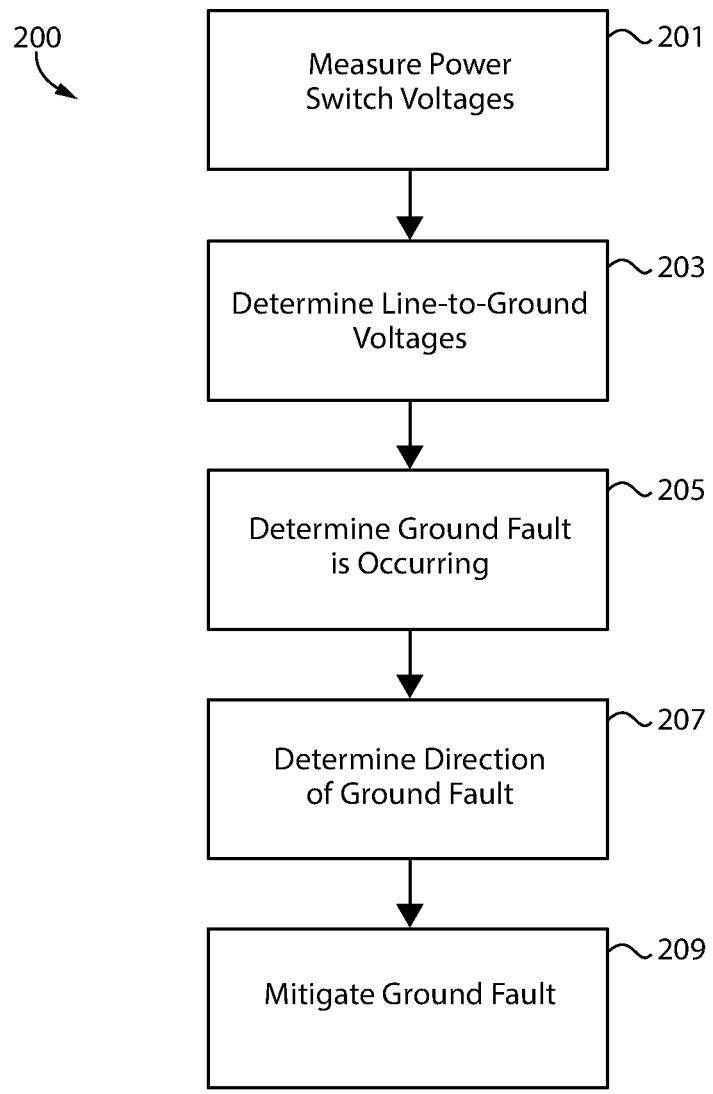
FIG. 2 is a flowchart illustrating an exemplary ground fault protection process.

With reference to FIG. 2, there is illustrated an exemplary ground fault protection process 200. The following description of process 200 is made with reference to system 100 illustrated in FIG. 1. It is to be understood, however, that process 200 may be used in combination with other forms of power systems, such as those described below with reference to FIGS. 3 and 4. It shall be appreciated that a number of variations and modifications to process 200 are contemplated including, for example, the omission of one or more aspects of process 200, the addition of further conditionals and operations, and/or the reorganization or separation of operations and conditionals into separate processes.

Process 200 proceeds to operation 201 where voltage measuring devices 128 and 129 measure voltages on each side of power switch 121. Measuring device 128 measures the source-side of power switch 121 while power switch 121 is receiving a load current from power source 111 at the source-side of power switch 121 and outputting the load current from the load-side of power switch 121 to load 131. Measuring device 129 measures the load-side of power switch 121 while measuring device 128 measures the source-side of power switch 121 such that measuring device 129 measures the load-side of power switch 121 while power switch 121 is receiving the load current from power source 111 at the source-side of power switch 121 and outputting the load current from the load-side of power switch 121 to load 131.

Process 200 proceeds to operation 203 where controller 122 determines the line-to-ground voltages for each side of the power switch, the line-to-ground voltage corresponding to voltages of power switch 121 during the ground fault. In certain embodiments, voltage measuring devices 128 and 129 are structured to measure the line-to-ground voltage for each terminal, and controller 122 determines the line-to-ground voltage for each terminal by receiving the voltage measurements from voltage measuring devices 128 and 129. In certain embodiments, controller 122 determines the line-to-ground voltages by calculating the line-to-ground voltage using the voltages received from measuring devices 128 and 129. For example, controller 122 may receive line-to-neutral voltages from measuring devices 128 and 129, and a separate neutral-ground measurement from another measuring device.

Process 200 proceeds to operation 205 where controller 122 determines a ground fault is occurring on one phase. Controller 122 may determine the ground fault is occurring by using the line-to-ground voltages determined in operation 203 and/or other information received by controller 122. For example, controller 122 may receive a voltage measurement corresponding to a voltage difference between a ground and a neutral point of the multiphase power. If the voltage difference exceeds a threshold, controller 122 determines a ground fault is occurring.

Process 200 proceeds to operation 207 where controller 122 determines the direction of the ground fault relative to power switch 121. For ground faults in close proximity to power switch 121, the line-ground voltage of the faulted side of power switch 121 will have a magnitude of 0V and the line-to-ground voltage of the non-faulted side of power switch 121 will have a magnitude equal to the on-state voltage drop of the phase power switch. While the distance from a ground fault determines the voltage difference between the neutral point of the system and the ground, the voltage difference is the same for both sides of the power switch. Therefore, while the faulted side of the power switch may not have a line-to-ground voltage of 0V, the magnitude of the line-ground voltage of the faulted side of the power switch will always be lower than the magnitude of the line-to-ground voltage of the non-faulted side of the power switch.

Controller 122 determines the ground fault direction by comparing a first magnitude of the source-side-to-ground voltage of the faulted phase and second magnitude of the load-side-to-ground voltage of the faulted phase. For the faulted phase, if the following expression is true, then the controller determines the ground fault direction is towards power network 110, where the ground fault is located on the same phase as phase power switch 123, $V_{123a}$ is the source-side-to-ground voltage, and $V_{123b}$ is the load-side-to-ground voltage: $|V_{123a}|<|V_{123b}|$. For the faulted phase, if the following expression is true, then the controller determines the ground fault direction is towards power network 130, where the ground fault is located on the same phase as phase power switch 123, $V_{123a}$ is the source-side-to-ground voltage, and $V_{123b}$ is the load-side-to-ground voltage: $|V_{123a}|>|V_{123b}|$.

Process 200 proceeds to operation 209 where HRG power system 100 mitigates the ground fault based on the determined direction of the ground fault. Mitigating the ground fault may include reporting an alarm event or operating the power switch, to name but a few examples. In certain embodiments, controller 122 may report the alarm event by transmitting a notification to a human-machine interface (HMI), a supervisory control and data acquisition (SCADA) system, or a battery management system (BMS), to give but a few examples. In certain embodiments, HRG power system 100 may operate the power switch by fully opening the power switch if the ground fault is located between a load and the power switch, or may partially open the power switch if the ground fault is located between a power source and the power switch. In certain embodiments, controller 122 determines whether to mitigate the ground fault by operating the power switch based on user-defined parameters or power system requirements. For example, controller 122 may be configured to open the power switch 121 once controller 122 determines two ground faults are occurring on different phases, but not open power switch 121 if controller 122 determines the power system is still able to operate according to a power quality parameter. Where a power system includes multiple ground fault protection systems, the multiple controllers may coordinate power switch operation based on the determined ground fault directions for each switch. It shall be appreciated that any or all of the foregoing features of process 200 may also be present in the other methods disclosed herein.

Figure 3:
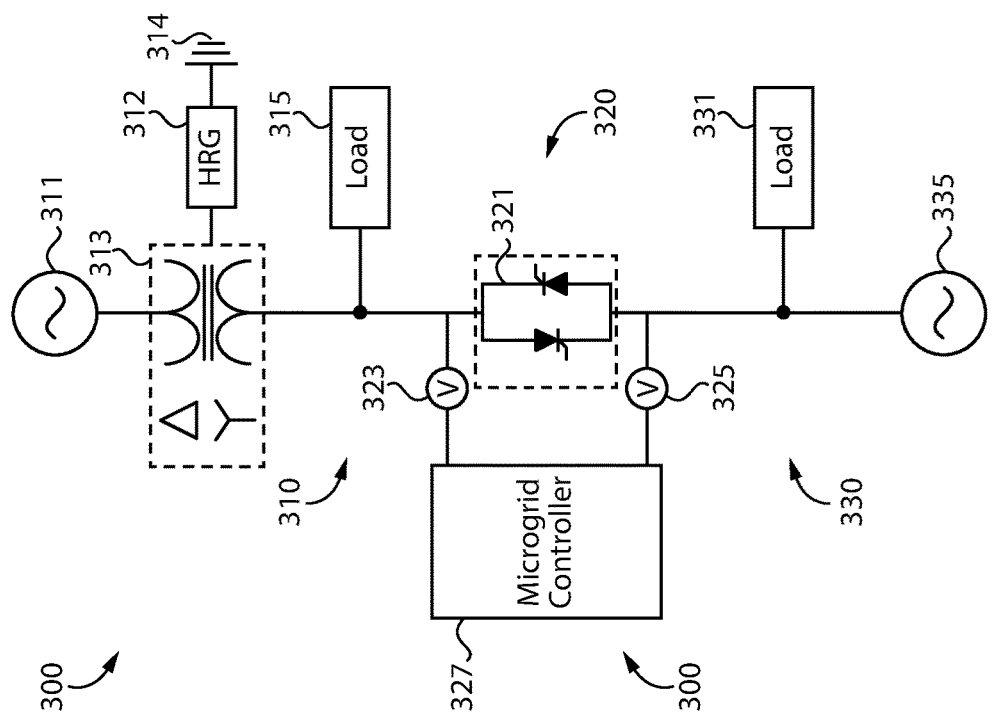
FIG. 3 is a circuit diagram illustrating an exemplary ground fault protection system including a microgrid disconnect switch.

With reference to FIG. 3, there is illustrated an exemplary HRG power system 300 including microgrid 301. It shall be appreciated that the topology of system 300 is illustrated for the purpose of explanation and is not intended as a limitation of the present disclosure. For example, system 300 may include more loads, more power generation systems, or more distributed generation systems, to name but a few examples. Although HRG power system 300 is illustrated with a single line diagram, system 300 may be structured to transmit single-phase power, multiphase power, or DC power.

HRG power system 300 includes a power network 310 including a power generation system 311 coupled to power transformer 313, and a load 315. A high resistance ground resistor 312 is coupled to a neutral point of power transformer 313 and ground 314. Microgrid 301 is coupled to power network 310.

Microgrid 301 includes ground fault protection system 320 and power network 330. Power network 330 includes load 331 and distributed energy resource 335. Microgrid 301 is structured to selectively disconnect from the remaining portion of HRG power system 300 and distribute power independently, also known as islanding. For example, microgrid 301 may island when a ground fault exists on power network 310 such that microgrid 301 is unable to meet system operating parameters or utility requirements.

Ground fault protection system 320 includes microgrid controller 327, voltage measuring devices 323 and 325, and microgrid disconnect switch 321. Microgrid controller 327 is structured to determine phase-to-ground voltages on each side of switch 321 using voltage measuring devices 323 and 325 and determine the direction of the ground fault using the phase-to-ground voltages. In certain embodiments, microgrid controller 327 is structured to island microgrid 301 by opening microgrid disconnect switch 321 in response to determining the ground fault is located outside microgrid 301.

Figure 4:
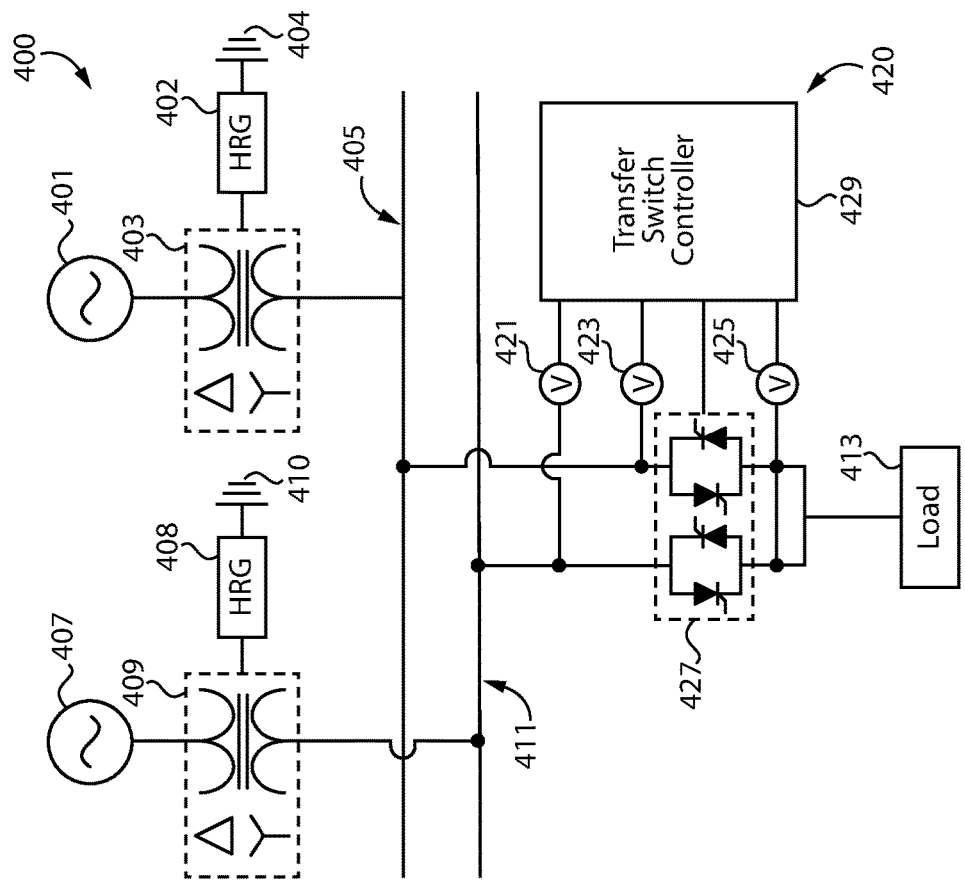
FIG. 4 is a circuit diagram illustrating an exemplary ground fault protection system including a transfer switch.

With reference to FIG. 4, there is illustrated an exemplary HRG power system 400 structured to transmit power from a selected power source to a load 413 using ground fault protection system 420. It shall be appreciated that the topology of system 400 is illustrated for the purpose of explanation and is not intended as a limitation of the present disclosure. For example, system 400 may include more loads or more power sources, to name but a few examples. Although HRG power system 400 is illustrated with a single line diagram, system 400 may be structured to transmit single-phase power, multiphase power, or DC power.

HRG power system 400 includes power network 405 including a power source 401 coupled to system 420 by way of a power transformer 403. Power transformer 403 is coupled to a high resistance grounding resistor 402 that is coupled to ground 404. HRG power system 400 includes power network 411 including a power source 407 coupled to system 420 by way of a power transformer 409. Power transformer 409 is also coupled to high resistance grounding resistor 408 that is coupled to ground 410.

Ground fault protection system 420 includes voltage measuring devices 421, 423, and 425, transfer switch 427, and transfer switch controller 429. Transfer switch 427 is structured to selectively couple either power source 401 or power source 407 to load 413. Transfer switch controller 429 is structured to determine phase-to-ground voltages on each side of switch 427 using voltage measuring devices 421, 423 and 425 and determine the direction of the location of the ground fault using the phase-to-ground voltages.

In certain embodiments, transfer switch controller 429 is structured to uncouple the load from one power source and couple the load to the other power source in response to determining the direction of the ground fault is towards power network including the initially coupled power source.

In certain embodiments, where the ground fault is located between the transfer switch and the load, the transfer switch controller may be structured to disconnect the load from power sources 401 and 407 by opening the transfer switch.

Figure 5:
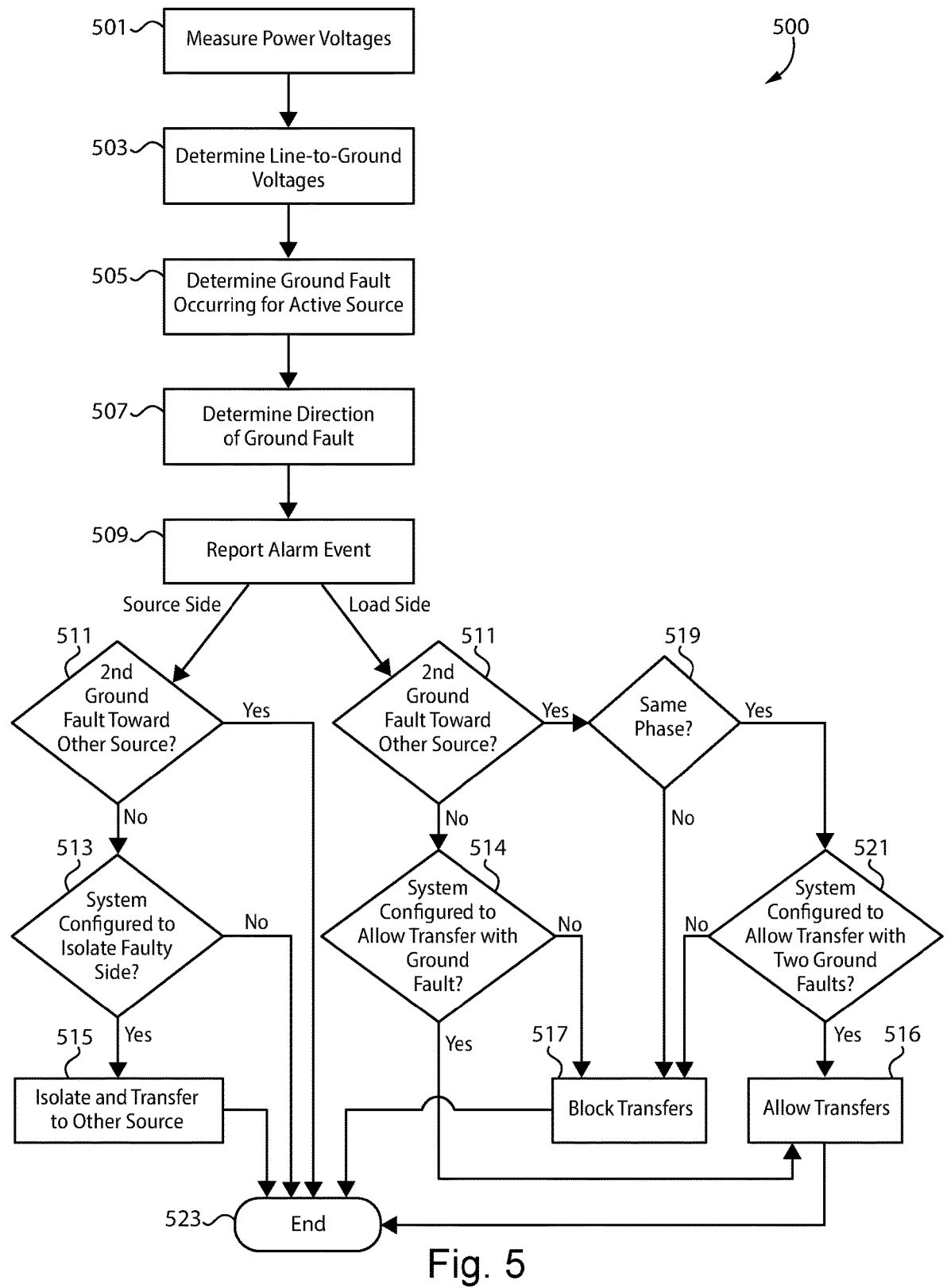
FIG. 5 is a flowchart illustrating an exemplary ground fault protection process.

With reference to FIG. 5, there is illustrated an exemplary ground fault protection process 500. The following description of process 500 is made with reference to system 400 illustrated in FIG. 4. It is to be understood, however, that process 500 may be used in combination with other power systems including a transfer switch or another type of power switch. It shall be appreciated that a number of variations and modifications to process 500 are contemplated including, for example, the omission of one or more aspects of process 500, the addition of further conditionals and operations, and/or the reorganization or separation of operations and conditionals into separate processes. While process 500 may not specifically describe features analogous to the features of process 200, such features may nonetheless be employed in connection with the described systems.

Process 500 proceeds to operation 501 where voltage measuring devices 421, 423, and 425 measure voltages on each side of transfer switch 427 while transfer switch 427 is conducting power from power source 401 to load 413.

Process 500 proceeds to operation 503 where controller 429 determines the line-to-ground voltages for each side of transfer switch 427, the line-to-ground voltages corresponding to voltages of transfer switch 427 during a ground fault. In certain embodiments, voltage measuring devices 421, 423, and 425 are structured to measure the line-to-ground voltage for each terminal, and determining the line-to-ground voltage for each terminal includes receiving the voltage measurements from voltage measuring devices 421, 423, and 425. In certain embodiments, controller 429 determines the line-to-ground voltages by calculating the line-to-ground voltage using the voltages received from measuring devices 421, 423, and 425. For example, controller 429 may receive line-to-neutral voltages from measuring devices 421, 423, and 425, and a neutral-ground voltage measurement from another measuring device.

Process 500 proceeds to operation 505 where controller 429 determines a ground fault is occurring. Controller 429 may determine the ground fault is occurring by using the line-to-ground voltages determined in operation 503 and/or other information received by controller 429. For example, controller 429 may receive a voltage measurement corresponding to a voltage difference between a ground and a neutral point of the multiphase power. If the voltage difference exceeds a threshold, controller 429 determines a ground fault is occurring.

Process 500 proceeds to operation 507 where controller 429 determines the direction of the ground fault relative to transfer switch 427. For ground faults in close proximity to power switch 121, the line-ground voltage of the faulted side of power switch 121 will have a magnitude of 0V and the line-to-ground voltage of the non-faulted side of power switch 121 will have a magnitude equal to the on-state voltage drop of the phase power switch. While the distance from a ground fault determines the voltage difference between the neutral point of the system and the ground, the voltage difference is the same for both sides of the power switch. Therefore, while the faulted side of the power switch may not have a line-to-ground voltage of 0V, the magnitude of the line-ground voltage of the faulted side of the power switch will always be lower than the magnitude of the line-to-ground voltage of the non-faulted side of the power switch.

Controller 429 determines the ground fault direction by comparing a first magnitude of the source-side-to-ground voltage of the faulted phase and second magnitude of the load-side-to-ground voltage of the faulted phase. For the faulted phase, if the following expression is true, then the controller determines the ground fault direction is towards power source 401, where $V_{401a}$ is the source-side-to-ground voltage for a first phase, and $V_{413a}$ is the load-side-to-ground voltage for the first phase: $|V_{401a}|<|V_{413a}|$. For the faulted phase, if the following expression is true, then controller 429 determines the ground fault direction is towards load 413, where $V_{401a}$ is the source-side-to-ground voltage for a first phase, and $V_{413a}$ is the load-side-to-ground voltage for the first phase: $|V_{401a}|>|V_{413a}|$.

Process 500 proceeds to operation 509 where HRG power system 400 begins to mitigate the ground fault by reporting the alarm event. In certain embodiments, controller 429 report the alarm event by transmitting a notification to a human-machine interface (HMI), a supervisory control and data acquisition (SCADA) system, or a battery management system (BMS), to give but a few examples.

If the direction of the ground fault is towards power source 401, process 500 proceeds to conditional 511, where controller 429 determines whether a second ground fault is occurring between power source 407 and transfer switch 427. If a second ground fault is occurring, process 500 proceeds to end operation 523.

If a second ground fault is not occurring, process 500 proceeds to conditional 513, where controller 429 determines whether system 400 should isolate the ground fault using transfer switch 427 based on user-defined parameters or power system requirements. Power quality requirement may include the number of operational phases, and not exceeding undervoltage/overvoltage thresholds, to name but a few examples. In certain embodiments, the user defines parameters considered in conditionals 513, 514, and 521 by selecting one of a plurality of settings. In a first setting, transfer switch 427 is not affected by the ground fault and transfers are allowed. In a second setting, transfer switch 427 locks onto the active source, and transfers to the alternate source only occur based on a set of power quality requirements. For example, transfer switch 427 may be opened due to a loss of a phase or an undervoltage condition deviating greater than 50% from nominal voltage, to name but a few examples. In a third setting, transfer switch 427 locks onto the active source and does not transfer under any condition.

If controller 429 determines system 400 should isolate the ground fault using transfer switch 427, process 500 proceeds to operation 515 where controller 429 operates transfer switch 427 so as to coupled power source 407 to load 413, isolating power source 401 from load 413 and transferring to power source 407. If controller 429 determines system 400 should not isolate the ground fault using transfer switch 427, process 500 proceeds to end operation 523.

If the direction of the ground fault is towards load 413, process 500 proceeds to conditional 512, where controller 429 determines whether a second ground fault is occurring between power source 407 and transfer switch 427. If a second ground fault is not occurring, process 500 proceeds to conditional 514, where controller 429 determines whether system 400 should allow power source transfers based on user-defined parameters or power system requirements.

If controller 429 determines system 400 should allow power source transfers, process 500 proceeds to operation 516 where controller 429 continues to allow transfers between power sources 401 and 407. If controller 429 determines system 400 should not allow power source transfers, process 500 proceeds to operation 517 where controller 429 blocks future transfers between power sources 401 and 407. From operation 517 or operation 516, process 500 proceeds to end operation 529.

If, during conditional 512, controller 429 determines a second ground fault is occurring towards power source 407, process 500 proceeds to conditional 519, where controller 429 determines whether the second ground fault is occurring on the same phase as the first ground fault. If the second ground fault is not occurring on the same phase as the second ground fault, process 500 proceeds to operation 517 where controller 429 blocks transfers to power source 407. If the second ground fault is occurring on the same phase, process 500 proceeds to conditional 521, where controller 429 determines whether system 400 should allow power source transfers to power source 407 based on user-defined parameters or power system requirements. If controller 429 determines system 400 should allow power source transfers, process 500 proceeds to operation 516. If controller 429 determines system 400 should not allow power source transfers, process 500 proceeds to operation 517.

Further written description of a number of exemplary embodiments shall now be provided. One embodiment is a ground fault protection system comprising a power switch including a source-side and a load-side, the power switch being structured to receive a load current from a power source at the source-side and selectively output the load current from the load-side to a load; a first voltage measuring device structured to measure a first voltage of the source-side while the power switch is conducting the load current; a second voltage measuring device structured to measure a second voltage of the load-side while the first voltage measuring device is measuring the first voltage; and a controller structured to determine a source-side-to-ground voltage based on the first voltage, determine a load-side-to-ground voltage based on the second voltage, determine a ground fault is occurring, and determine a direction of the ground fault relative to the power switch by comparing the source-side-to-ground voltage and the load-side-to-ground voltage.

In certain forms of the foregoing ground fault protection system, the ground fault protection system is incorporated into a power system including a high resistance ground resistor. In certain forms, the power switch is structured to receive multiphase power at the source-side and output the multiphase power at the load-side. In certain forms, the controller determines a ground fault is occurring based on a voltage difference between ground and a neutral point of the multiphase power. In certain forms, the source-side includes a source-side terminal and the load-side includes a load-side terminal, and wherein the first voltage is measured at the source-side terminal and the second voltage is measured at the load-side terminal. In certain forms, the controller determines the ground fault direction by comparing a first magnitude of the source-side-to-ground voltage and second magnitude of the load-side-to-ground voltage. In certain forms, the controller determines the ground fault direction is towards a first power network including the power source and coupled to the source-side by determining the first magnitude is less than the second magnitude, and wherein the controller determines the ground fault direction is towards a second power network including the load and coupled to the load-side by determining the first magnitude is greater than the second magnitude. In certain forms, the ground fault protection system comprises a second power switch coupled between the first power switch and the load, and a second controller structured to determine a second ground fault direction towards the first power switch, receive the first ground fault direction, and operate the power switch based on the first ground fault direction and the second ground fault direction. In certain forms, the power switch is coupled to a microgrid including the load and a distributed energy resource, and wherein the controller opens the power switch in response to determining the ground fault direction is towards the power source. In certain forms, the power switch is a transfer switch coupled to a second power source, wherein the power switch is structured to selectively couple either the first power source or the second power source to the load, and wherein the controller is structured to block a transfer from the first power source to the second power source in response to determining a second ground fault is occurring on a different phase than a first phase on which the first ground fault is occurring.

Another exemplary embodiment is a ground fault protection method comprising: operating a power switch including a source-side and a load-side; measuring a first voltage of the source-side while the power switch is receiving a load current from a power source at the source-side and outputting the load current from the load-side to a load; measuring a second voltage of the load-side while the power switch is receiving the load current from the power source at the source-side and outputting the load current from the load-side to a load; determining a source-side-to-ground voltage based on the first voltage; determining a load-side-to-ground voltage based on the second voltage; determining a ground fault is occurring; and determining a direction of the ground fault relative to the power switch by comparing the source-side-to-ground voltage and the load-side-to-ground voltage.

In certain forms of the foregoing method, the power switch is incorporated into a high resistance ground system. In certain forms, the power switch is structured to receive multiphase power at the source-side and output the multiphase power at the load-side. In certain forms, determining the ground fault is occurring is based on a voltage difference between ground and a neutral point of the multiphase power. In certain forms, the source-side includes a source-side terminal and the load-side includes a load-side terminal, and wherein the first voltage is measured at the source-side terminal and the second voltage is measured at the load-side terminal. In certain forms, determining the ground fault direction includes comparing a first magnitude of the source-side-to-ground voltage and second magnitude of the load-side-to-ground voltage. In certain forms, determining the ground fault direction includes determining the ground fault is towards a first power network including the power source and coupled to the source-side when the first magnitude is less than the second magnitude, and wherein determining the ground fault direction includes determining the ground fault is towards a second power network including the load and coupled to the load-side when the first magnitude is greater than the second magnitude. In certain forms, the method comprises operating a second power switch coupled between the first power switch and the load; determining a second ground fault direction is towards the first power switch; receiving the first ground fault direction; and operating the power switch based on the first ground fault direction and the second ground fault direction. In certain forms, the power switch is coupled to a microgrid including the load and a distributed energy resource, and wherein the method comprises opening the power switch in response to determining the ground fault direction is towards the power source. In certain forms, the power switch is a transfer switch coupled to a second power source, wherein the power switch is structured to selectively couple either the first power source or the second power source to the load, and wherein the method comprises blocking a transfer from the first power source to the second power source in response to determining a second ground fault is occurring on a different phase than a first phase on which the first ground fault is occurring.

It is contemplated that the various aspects, features, processes, and operations from the various embodiments may be used in any of the other embodiments unless expressly stated to the contrary. Certain operations illustrated may be implemented by a computer including a processing device executing a computer program product on a non-transient, computer-readable storage medium, where the computer program product includes instructions causing the processing device to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A ground fault protection system comprising:
    a power switch including a source-side and a load-side, the power switch being structured to receive a load current from a power source at the source-side and selectively output the load current from the load-side to a load;
    a first voltage measuring device structured to measure a first voltage of the source-side while the power switch is conducting the load current;
    a second voltage measuring device structured to measure a second voltage of the load-side while the first voltage measuring device is measuring the first voltage; and
    a controller structured to determine a source-side-to-ground voltage based on the first voltage, determine a load-side-to-ground voltage based on the second voltage, determine a ground fault is occurring, and determine a direction of the ground fault relative to the power switch by comparing the source-side-to-ground voltage and the load-side-to-ground voltage;
        wherein the controller determines whether to mitigate the ground fault based on the direction of the ground fault by opening the power switch in response to the controller determining two ground faults are occurring on different phases.

2. The ground fault protection system of claim 1, wherein the ground fault protection system is incorporated into a power system including a high resistance ground resistor.

3. The ground fault protection system of claim 1, wherein the power switch is structured to receive multiphase power at the source-side and output the multiphase power at the load-side.

4. The ground fault protection system of claim 3, wherein the controller determines a ground fault is occurring based on a voltage difference between ground and a neutral point of the multiphase power.

5. The ground fault protection system of claim 1, wherein the source-side includes a source-side terminal and the load-side includes a load-side terminal, and wherein the first voltage is measured at the source-side terminal and the second voltage is measured at the load-side terminal.

6. The ground fault protection system of claim 1, wherein the controller determines the ground fault direction by comparing a first magnitude of the source-side-to-ground voltage and second magnitude of the load-side-to-ground voltage.

7. The ground fault protection system of claim 6, wherein the controller determines the ground fault direction is towards a first power network including the power source and coupled to the source-side by determining the first magnitude is less than the second magnitude, and wherein the controller determines the ground fault direction is towards a second power network including the load and coupled to the load-side by determining the first magnitude is greater than the second magnitude.

8. The ground fault protection system of claim 1, comprising a second power switch coupled between the first power switch and the load, and a second controller structured to determine a second ground fault direction towards the first power switch, receive the first ground fault direction, and operate the power switch based on the first ground fault direction and the second ground fault direction.

9. The ground fault protection system of claim 1, wherein the power switch is coupled to a microgrid including the load and a distributed energy resource, and wherein the controller opens the power switch in response to determining the ground fault direction is towards the power source.

10. The ground fault protection system of claim 1, wherein the power switch is a transfer switch coupled to a second power source, wherein the power switch is structured to selectively couple either the first power source or the second power source to the load, and wherein the controller is structured to block a transfer from the first power source to the second power source in response to determining a second ground fault is occurring on a different phase than a first phase on which the first ground fault is occurring.

11. A ground fault protection method comprising:
    operating a power switch including a source-side and a load-side;
    measuring a first voltage of the source-side while the power switch is receiving a load current from a power source at the source-side and outputting the load current from the load-side to a load;
    measuring a second voltage of the load-side while the power switch is receiving the load current from the power source at the source-side and outputting the load current from the load-side to a load;
    determining a source-side-to-ground voltage based on the first voltage;
    determining a load-side-to-ground voltage based on the second voltage;
    determining a ground fault is occurring;
    determining a direction of the ground fault relative to the power switch by comparing the source-side-to-ground voltage and the load-side-to-ground voltage; and
    determining, by a controller, whether to mitigate the ground fault based on the direction of the ground fault by opening the power switch in response to the controller determining two ground faults are occurring on different phases.

12. The ground fault protection method of claim 11, wherein the power switch is incorporated into a high resistance ground system.

13. The ground fault protection method of claim 11, wherein the power switch is structured to receive multiphase power at the source-side and output the multiphase power at the load-side.

14. The ground fault protection method of claim 13, wherein determining the ground fault is occurring is based on a voltage difference between ground and a neutral point of the multiphase power.

15. The ground fault protection method of claim 11, wherein the source-side includes a source-side terminal and the load-side includes a load-side terminal, and wherein the first voltage is measured at the source-side terminal and the second voltage is measured at the load-side terminal.

16. The ground fault protection method of claim 11, wherein determining the ground fault direction includes comparing a first magnitude of the source-side-to-ground voltage and second magnitude of the load-side-to-ground voltage.

17. The ground fault protection method of claim 16, wherein determining the ground fault direction includes determining the ground fault is towards a first power network including the power source and coupled to the source-side when the first magnitude is less than the second magnitude, and wherein determining the ground fault direction includes determining the ground fault is towards a second power network including the load and coupled to the load-side when the first magnitude is greater than the second magnitude.

18. The ground fault protection method of claim 11, comprising:
    operating a second power switch coupled between the first power switch and the load;
    determining a second ground fault direction is towards the first power switch;
    receiving the first ground fault direction; and
    operating the power switch based on the first ground fault direction and the second ground fault direction.

19. The ground fault protection method of claim 11, wherein the power switch is coupled to a microgrid including the load and a distributed energy resource, and wherein the method comprises opening the power switch in response to determining the ground fault direction is towards the power source.

20. The ground fault protection method of claim 11, wherein the power switch is a transfer switch coupled to a second power source, wherein the power switch is structured to selectively couple either the first power source or the second power source to the load, and wherein the method comprises blocking a transfer from the first power source to the second power source in response to determining a second ground fault is occurring on a different phase than a first phase on which the first ground fault is occurring.

* * * * *